United States Patent [19]
Daniels et al.

[11] Patent Number: 6,063,858
[45] Date of Patent: *May 16, 2000

[54] ADHESIVE FOR DIFFICULT TO BOND SURFACES

[75] Inventors: Christian Leonard Daniels, Macungie; Randolf J. Lorenz, Wyomissing; Richard Joseph Goddard, Souderton, all of Pa.

[73] Assignee: Air Products and Chemicals, Inc., Allentown, Pa.

[ * ] Notice: This patent is subject to a terminal disclaimer.

[21] Appl. No.: 09/196,451

[22] Filed: Nov. 19, 1998

Related U.S. Application Data

[63] Continuation of application No. 08/890,436, Jul. 9, 1997, Pat. No. 5,872,181.

[51] Int. Cl.⁷ ........................................... C08L 31/02
[52] U.S. Cl. ..................... 524/563; 524/564; 524/755; 524/819; 524/823; 526/331
[58] Field of Search ..................... 524/563, 564, 524/755, 819, 823; 526/331

[56] References Cited

U.S. PATENT DOCUMENTS

| | | |
|---|---|---|
| 3,708,388 | 1/1973 | Lindemann . |
| 4,128,518 | 12/1978 | Oyamada et al. . |
| 4,892,917 | 1/1990 | Mudge ..................................... 526/318 |

*Primary Examiner*—Fred Zitomer
*Attorney, Agent, or Firm*—Russell L. Brewer

[57] ABSTRACT

Improved aqueous emulsion vinyl acetate-ethylene (VAE) polymer adhesives for use in packaging applications and on difficult to bond surfaces such as polyethylene, poly (ethylene terephthalate), and oriented polypropylene. The VAE polymers contain about 55–80 wt % vinyl acetate, 15–45 wt % ethylene, and 0–30 wt % of one or more additional ethylenically unsaturated copolymerizable monomer, based on the total weight of monomers. Cast films of the VAE emulsion polymers of this invention should have a tensile storage modulus (test frequency of 6.28 rad/sec) within the area encompassed by the following data points: $1\times10^5$ and $2\times10^7$ dynes/cm$^2$ at 23° C., and $1\times10^3$ and $2\times10^6$ dynes/cm$^2$ at 70° C.; preferably within the area encompassed by the following data points: $1\times10^6$ and $1.5\times10^7$ dynes/cm$^2$ at 23° C., and $3\times10^4$ and $9\times10^5$ dynes/cm$^2$ at 70° C.

43 Claims, 2 Drawing Sheets

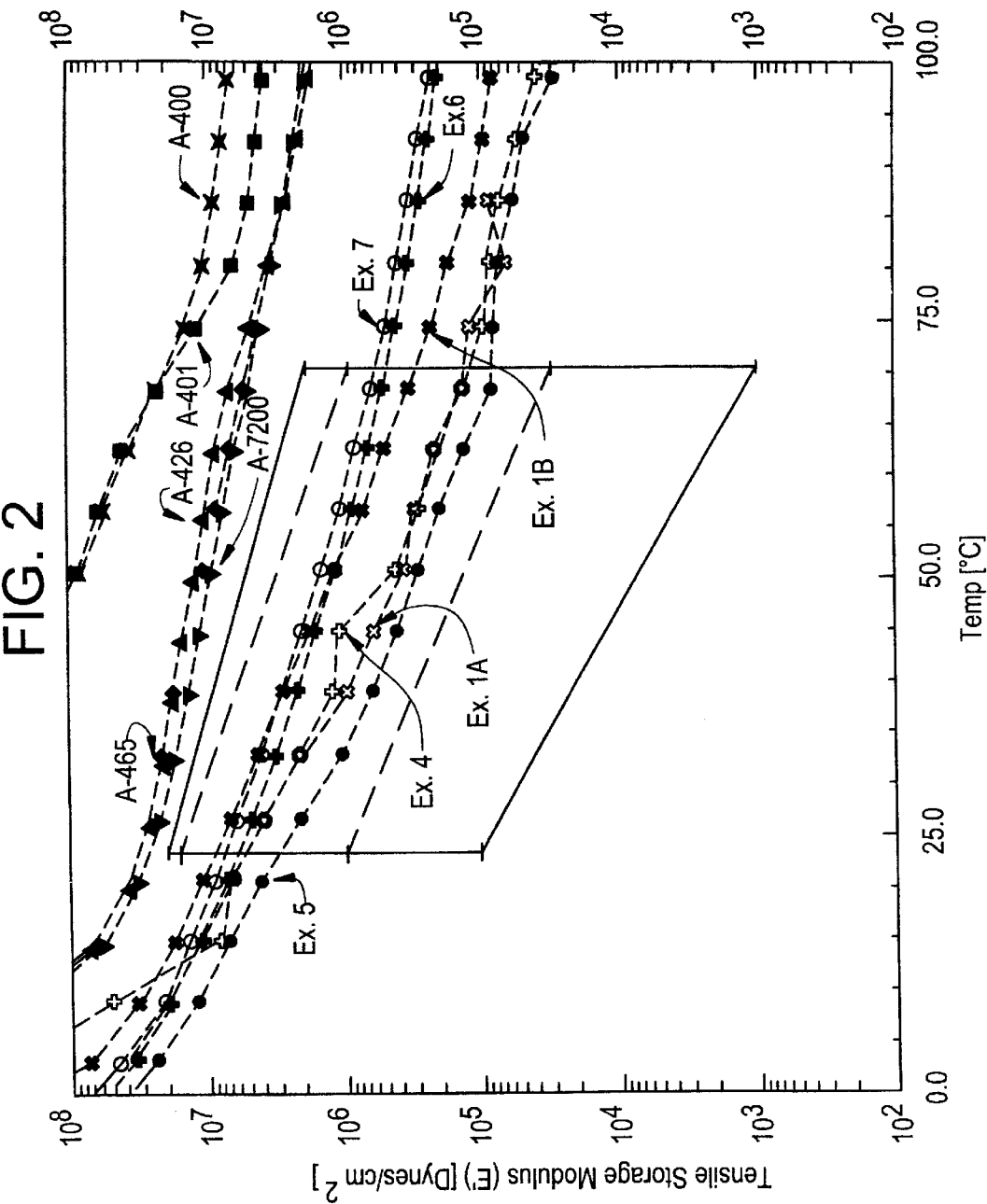

ADHESIVE FOR DIFFICULT TO BOND SURFACES

CROSS-REFERENCE TO RELATED APPLICATIONS

This application is a continuation of Ser. No 08/890,436 having a filing date of Jul. 9, 1997, U.S. Pat. No. 5,872,181.

STATEMENT REGARDING FEDERALLY SPONSORED RESEARCH OR DEVELOPMENT

Not applicable.

BACKGROUND OF THE INVENTION

There are many known aqueous emulsion polymers that are used in a variety of applications, including adhesive applications. Vinyl acetate-ethylene (VAE) emulsion polymers have been preferred in water-based packaging adhesive applications primarily because of the low cost of production, availability of reactants, the adhesion, setting speed, and wet tack properties they offer on glass, metal, corrugated and other paperboard materials, and the ease at which they can be applied and maintained on adhesive application equipment.

Over the past 8–10 years there has been a continuous shift in the type of packaging materials utilized in the industry. Today the segment which is based on plastic or polymeric materials is growing and rapidly replacing the traditional materials mentioned above. This new class of plastic packaging is far more difficult to adhere to than glass, metal and paper-based packaging materials which have been in use.

Various methods have been used to improve the bonding of VAE adhesives to difficult to bond substrates, such as polyethylene, polypropylene, poly(ethylene terephthalate), and surfaces having low surface energy, low polarity, or little or no porosity. Surface treatments, such as plasma treatment, corona discharge, or chemical oxidation, have been used to alter the surface so that they can more easily be bonded with VAE adhesives; however these treatments are expensive and time consuming, and are not always possible.

In order to achieve adhesion on difficult to bond surfaces, traditional VAE adhesive formulations have been highly plasticized or formulated. However, introduction of additional compounding aids adds to the complexity and cost of the formulations and, frequently leads to problems during the application and/or machining of the resulting adhesives. In addition, the list of additives available to the adhesive formulators is decreasing because many of the solvents and plasticizers used in the past are no longer environmentally acceptable.

Another approach to improve the bonding of VAE adhesives to low polarity surfaces has been to add other monomers to the polymer. For example, U.S. Pat. No. 5,371,137 (Blincow et al. 1994) discloses VAE copolymer emulsions to which about 5% to about 85% of vinyl esters of $C_4$ to $C_{18}$ primary or secondary carboxylic acids have been added as a monomer. U.S. Pat. No. 5,500,251 (Burgoyne et al., 1996) disclose the incorporation of the following compounds into VAE systems to promote adhesion to low energy polyolefin surfaces: N-(4-alkylphenyl)acrylamides, N-(4-alkylphenyl) methacrylamides and N-(4-alkylphenyl)maleimides.

VAE pressure sensitive adhesives will adhere to most surfaces but lack of both cohesive strength and wet tack limits the use of these adhesives on difficult to bond surfaces, particularly when the surfaces are exposed to high temperatures. U.S. Pat. No. 4,128,518 (Oyamada et al.) discloses a VAE pressure sensitive adhesive containing a base material of an aqueous emulsion of vinyl acetate-ethylene copolymer having an ethylene content of 15 to 40% by weight, benzene-insoluble part of less than 30% by weight, and an intrinsic viscosity of the benzene-soluble part of 0.4 to 1.4 dl/g. It is prepared by the emulsion copolymerization of vinyl acetate and ethylene and optionally at least one unsaturated monovinyl monomer in the presence of a protective colloid and a polyoxyethylenic nonionic surfactant.

With increased use of difficult to bond or low polar surfaces, such as polyethylene and oriented polypropylene, in the packaging industry, there has been continuing interest in producing an adhesive that provides good adhesion without the need to pretreat the surfaces and/or add plasticizers or other modifiers to VAE adhesives.

BRIEF SUMMARY OF THE INVENTION

This invention is directed to improved vinyl acetate-ethylene (VAE) latex polymers, that are suitable for use as adhesives for packaging applications and on difficult to bond surfaces such as polyethylene (PE), poly(ethylene terephthalate) (PET), metallized poly(ethylene terephthalate) (MPET), and oriented polypropylene (OPP). They have specific viscoelastic properties as indicated by tensile storage modulus of the cast film. The tensile storage modulus, at a test frequency of 6.28 rad/sec, is defined by the area encompassed by the following data points: $1 \times 10^5$ and $2 \times 10^7$ dynes/cm$^2$ at 23° C., and $1 \times 10^3$ and $2 \times 10^6$ dynes/cm$^2$ at 70° C. The VAE latex polymer contains 55 to 80 wt % vinyl acetate, 15 to 45 wt % ethylene, and 0 to 30 wt % of one or more additional ethylenically unsaturated copolymerizable monomer.

The advantages of the latexes of this invention are:

they can be applied directly to difficult to bond surfaces without pretreating the surfaces or adding modifiers to the latex;

they have excellent adhesive properties on difficult to bond surfaces; and they are useful for packaging applications.

BRIEF DESCRIPTION OF THE SEVERAL VIEWS OF THE DRAWINGS

FIG. 2 is a magnified section of the graph presented in FIG. 1, showing the desired (solid line) and preferred (broken line) region of tensile storage modulus of the polymers of this invention.

DETAILED DESCRIPTION OF THE INVENTION

Figure 1:
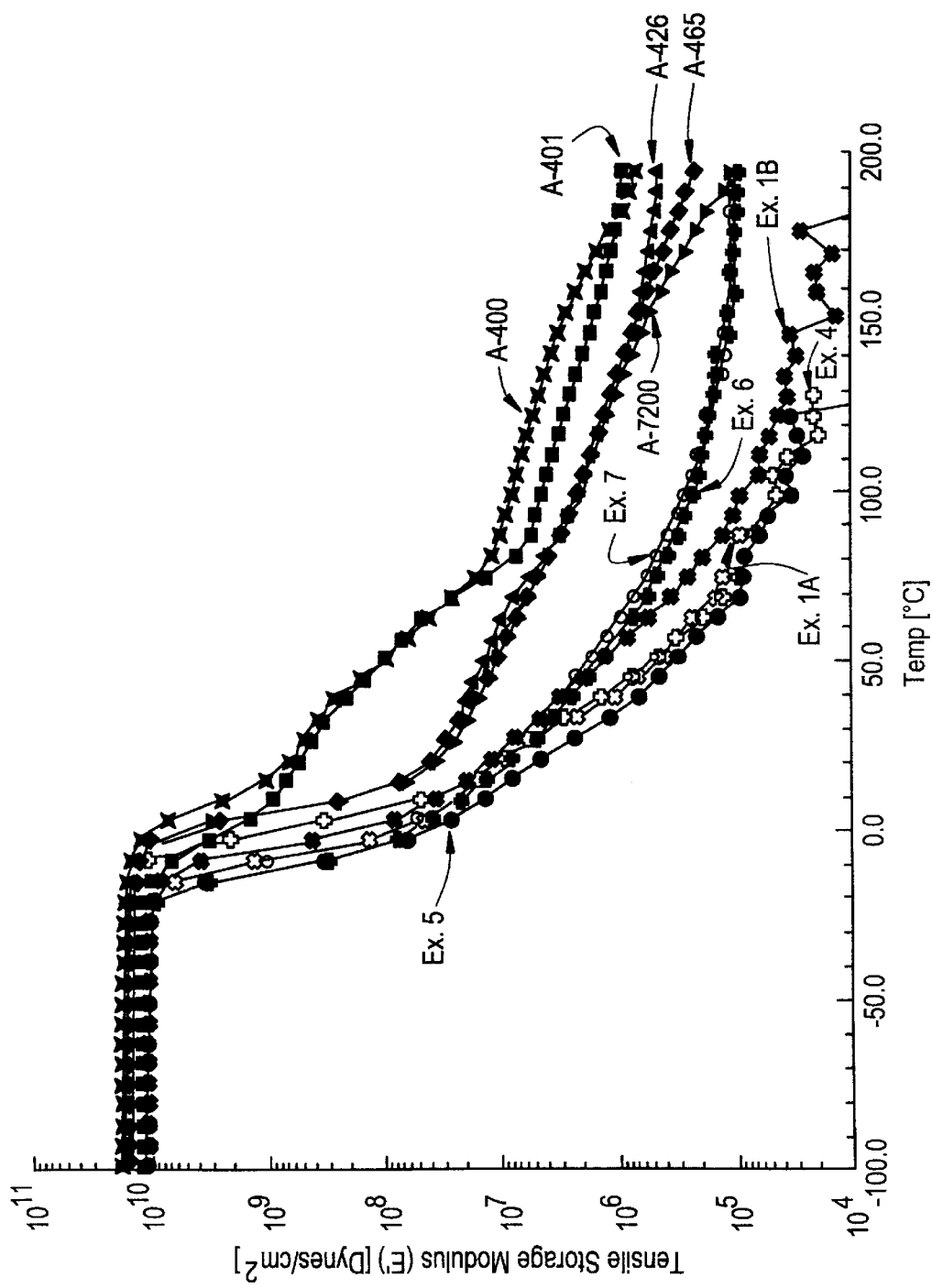
FIG. 1 is a graph of tensile storage modulus vs temperature for several VAE aqueous emulsion polymer adhesives.

The aqueous emulsion polymers according to this invention are useful as adhesives on difficult to bond surfaces and in packaging applications. The polymers comprise vinyl acetate, ethylene, and, optionally, one or more additional ethylenically unsaturated copolymerizable monomer.

Specifically, the emulsion polymers comprise 55–80 wt % vinyl acetate, 15–45 wt % ethylene, and 0–30 wt % of one or more additional ethylenically unsaturated copolymerizable monomer; preferably the copolymers contain 60 to 75 wt % vinyl acetate, 20 to 40 wt % ethylene, and 1–5 wt % of one or more additional ethylenically unsaturated copolymerizable monomer, based on total weight of monomers.

The additional ethylenically unsaturated copolymerizable monomer can be $C_3$–$C_{10}$ alkenoic acids, such as acrylic acid, methacrylic acid, crotonic acid and isocrotonic acid and their esters with $C_1$–$C_{18}$ alkanols, such as methanol, ethanol, propanol, butanol, and 2-ethylhexanol; vinyl halides, such as vinyl chloride; alpha, beta-unsaturated $C_4$–$C_{10}$ alkenedioic acids such as maleic acid, fumaric acid, and itaconic acid and their monoesters and diesters with the same $C_1$–$C_{18}$ alkanols; and nitrogen containing monoolefinically unsaturated monomers, particularly nitriles, amides, N-methylol amides, lower alkanoic acid ethers of N-methylol amides and allylcarbamates, such as acrylonitrile, acrylamide, methacrylamide, N-methylol acrylamide, N-methylol methacrylamide, N-methylol allylcarbamate, and lower alkyl ethers or lower alkanoic acid esters of N-methylol acrylamide, N-methylol methacrylamide and N-methylol allylcarbamate. A carboxyl-containing monomer, such as acrylic acid, is preferred.

Cast films of the VAE emulsion polymers of this invention should have a tensile storage modulus (test frequency of 6.28 rad/sec) within the area encompassed by the following data points: $1 \times 10^5$ and $2 \times 10^7$ dynes/cm$^2$ at 23° C., and $1 \times 10^3$ and $2 \times 10^6$ dynes/cm$^2$ at 70° C.; preferably within the area encompassed by the following data points: $1 \times 10^6$ and $1.5 \times 10^7$ dynes/cm$^2$ at 23° C., and $3 \times 10^4$ and $9 \times 10^5$ dynes/cm$^2$ at 70° C. In generating FIGS. 1 and 2, the tensile storage modulus is plotted against temperature. As can be seen from FIGS. 1 and 2, the plot defines a curve which has a segment that passes from beginning to end through a region encompassed by the data points as described above. These data points, then define the boundaries of the regions shown on FIGS. 1 and 2. It has been found in this invention that tensile mechanical properties, specifically tensile storage modulus, provide an accurate measure of viscoelastic properties and is an important indicator in evaluating adhesive properties.

Without intending to be bound by theory, it is believed that VAE emulsion polymers having a tensile storage modulus segment below the area encompassed by $1 \times 10^5$ and $2 \times 10^7$ dynes/cm$^2$ at 23° C., and $1 \times 10^3$ and $2 \times 10^6$ dynes/cm$^2$ at 70° C., will be too soft for use as an adhesive for difficult to bond surfaces, and VAE emulsion polymers having a tensile modulus segment above the region will not have sufficient peel strength for difficult to bond surfaces.

The method of producing the latex polymers of this invention is believed to be an important factor in producing an adhesive with tensile mechanical properties that provide excellent peel strength while retaining sufficient creep resistance to make it useful for application to difficult to bond surfaces.

Below are described process conditions which have been found to be effective in producing an aqueous emulsion polymer having the required tensile storage modulus. Process conditions that are considered to be particularly important are: controlling the amount of vinyl acetate in the reaction medium at the beginning and during the polymerization process, adding initiator at the high end of the amounts typically used in emulsion polymerization reactions, and use of a chain transfer agent. It is believed that these conditions serve to control the polymer molecular weight and ultimately the viscoelastic properties as shown by tensile dynamic mechanical data.

The reaction vessel is charged initially with less than 15%, preferably less than 10%, vinyl acetate, and the remaining vinyl acetate is delay fed (i.e. added during polymerization) so that the unreacted vinyl acetate concentration is maintained below about 5%, preferably below 3.5%, based on total monomers, during the polymerization process. Vinyl acetate monomer is added at a rate that limits the polymerization time to no longer than about 10 hours, preferably less than 6 hours. Short reaction times, i.e., less than 6 hours, are preferred in order to maximize throughput during production and to improve product performance.

The quantity of ethylene entering into the copolymer is influenced by unreacted vinyl acetate, pressure, agitation and viscosity of the polymerization medium. Thus, to increase the ethylene content of the copolymer, high pressures, greater agitation and a low viscosity can be employed. Ethylene pressure ranges from about 500 psig to 1400 psig (34 to 95 atm), preferably about 1000 psig (68 atm).

Polymerization can be initiated by thermal initiators or by a redox system. A thermal initiator is typically used at temperatures at or above about 70° C. and redox systems are preferred at temperatures below about 70° C. The amount of thermal initiator used in the process is 0.1 to 3 wt %, preferably more than about 0.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. The oxidizing agent can include hydrogen peroxide, organic peroxide such as t-butyl peroxide, persulfates, and the like.

Chain transfer agents, well known in the aqueous emulsion polymerization art; are typically used but are not required. Examples include dodecyl mercaptan, mercaptocarboxylic acids, and esters of mercaptocarboxylic acid. The chain transfer agent is added at levels of about 0.02 to 2 wt %, preferably 0.1 to 1 wt %, based on the weight of monomers.

Effective emulsion polymerization reaction temperatures range from about 50 and 100° C.; preferably, 75 to 90° C.

In addition to the above reaction conditions and components, the polymer latex may be stabilized with conventional emulsifiers and protective colloids; however, the use of polyvinyl alcohol is preferred because it improves heat resistance, adhesion to metallized surfaces (i.e. MPET), speed of set, and wet tack. The stabilizing system typically consists of 0.5–5 wt %, preferably 2–5 wt %, of polyvinyl alcohol and 1–4 wt %, preferably 1.5–3 wt % of a surfactant, based on vinyl acetate monomer. The polyvinyl alcohol that is used in the stabilizing system can be 75–99+ mole % hydrolyzed, preferably 85–90, and especially 87–89 mole % hydrolyzed, and has a degree of polymerization ranging from 50 to 3000; preferably, 100 to 1500; and most preferably, 200 to 1000. The degree of polymerization of the polyvinyl alcohol affects the viscosity of the emulsion product; i.e., as degree of polymerization increases, viscosity of the emulsion product increases. In this emulsion polymer, a viscosity between about 2,000 and 4,000 cps is preferred for ease of handling the emulsion product.

The stabilizer can also contain a surfactant at a level of about 1–4 wt %, preferably 1.5–3 wt %, based on vinyl acetate monomer. The surfactants contemplated for the invention include any of the known and conventional surfactants and emulsifying agents, principally the nonionic and anionic materials, heretofore employed in the emulsion copolymerization of vinyl acetate and ethylene; polyalkoxylated surfactants being especially preferred. Among the nonionic surfactants found to provide good results are the Igepal surfactants supplied by Rhone-Poulenc. The Igepal surfactants are members of a series of alkylphenoxy-poly (ethyleneoxy)ethanols having alkyl groups containing from about 7–18 carbon atoms, and having from about 4 to 100 ethyleneoxy units, such as the octylphenoxy poly (ethyleneoxy)ethanols, nonylphenoxy poly(ethyleneoxy) ethanols, and dodecylphenoxy poly(ethyleneoxy)ethanols. Examples of nonionic surfactants include polyoxyalkylene derivatives of hexitol (including sorbitans, sorbides, manitans, and mannides) anhydride, partial long-chain fatty acid esters, such as polyoxyalkylene derivatives of sorbitan monolaurate, sorbitan monopalmitate, sorbitan monostearate, sorbitan tristearate, sorbitan monooleate and sorbitan trioleate.

The glass transition temperature (Tg) of the aqueous emulsion polymers of this invention is typically 0° C. or lower; preferably –5 to –45° C., because they have both good flexibility and good adhesion.

Although not all inclusive, examples of difficult to bond surfaces are polyethylene (PE), poly(ethylene terephthalate) (PET), metallized poly(ethylene terephthalate) (MPET), polypropylene, oriented polypropylene (OPP), polyester, aluminum foil, and coated paperboard. Included among the difficult to bond surfaces are surfaces having a surface energy of less than about 40 dynes/cm$^2$.

The invention will be further clarified by a consideration of the following examples, which are intended to be purely exemplary of the invention.

Examples 1–7 illustrate the production of VAE polymer emulsions using the process conditions described above. Examples 1A and 1B were 30 gallon scale-ups of Example 1.

EXAMPLE 1

Vinyl Acetate-Ethylene-Acrylic Acid Polymers

The polymer was prepared in a one-gallon reactor equipped with a jacket for cooling, a mechanical turbine agitator, and metering pumps for addition of the various feeds. Deionized water was used. The reactor was charged with 1113 g of water, 57.0 g of Airvol® 203 poly (vinyl alcohol) (supplied by Air Products and Chemicals, Inc.), 40.7 g of Igepal CO-887 (70% solution of a 30 mole nonylphenolethoxylate supplied by Rhone-Poulenc) and 75.0 g vinyl acetate. After the initial charging, the reactor was purged with nitrogen followed by an ethylene purge, and heated under agitation to 85° C., then pressurized to 1000 psig (68 atm) with ethylene. Addition of an ammonium persulfate (40 g ammonium persulfate (APS), 17 g sodium bicarbonate and 347 g water) solution was begun at a rate of 2.5 g/min; after 8 minutes the feed rate was slowed to 2.0 g/min. Upon evidence of an exotherm (about 5 minutes after beginning the persulfate feed), addition of a second monomer solution was begun and added uniformly over a 3-hour period. The second monomer solution consisted of: 1225.2 g vinyl acetate, 57.0 g acrylic acid, and 9.5 g n-dodecyl mercaptan, as chain transfer agent. During the polymerization, ethylene was introduced to the reactor at a rate sufficient to maintain the pressure at 1000 psig. The persulfate addition was discontinued 15 minutes after the monomer addition was complete. The contents were then held at 85° C. for an additional 45 minutes and then cooled to 32° C. The contents were then transferred to a 3-gallon vessel where vacuum was used to remove any unreacted ethylene. At this point, 2 g of Colloids™ 675 (a proprietary defoamer composition supplied by Rhone-Poulenc) was added to reduce foaming, followed by 1 g of sodium erythorbate in 10 g of water, then 1 g of t-butyl hydroperoxide in 10 g of water, to reduce residual vinyl acetate.

EXAMPLE 1A

Scale-Up of Example 1

Example 1A was a scale-up of Example 1, from a one-gallon reactor to a 30-gallon reactor. In this example, Airvol 203 was replaced with Airvol®205 poly (vinyl alcohol), supplied by Air Products and Chemicals, Inc. The following additional changes were made: pressure was 900 psi (61 atm); ammonium persulfate was 1.5 wt % of the total monomers.

EXAMPLE 1B

Scale-Up of Example 1

Example 1 B was a scale-up of Example 1 from a one-gallon reactor to a 30-gallon reactor. In this example, Airvol 203 was replaced with Airvol205 and Airvol®523 (86.3 and 13.7%, respectively) poly (vinyl alcohol), supplied by Air Products and Chemicals, Inc. The following additional changes were made: pressure was 900 psi (61 atm); the temperature was 80° C.; initial vinyl acetate was increased from 5.5 to 8.4% of the total monomer charge. The amount of ammonium persulfate was 1.1 wt % of total monomers.

EXAMPLES 2–4

The procedure of Example 2 was the same as Example 1, except that ½ the amount of chain transfer agent (3.8 g) was used. Examples 3 and 4 were the same as Example 2 with the following changes in the amount of reactants and the pressure:

Example 3: the pressure was 700 psi (48 atm) and 1525.1 g vinyl acetate was used in the second monomer solution.

Example 4: the pressure was 550 psi (37 atm) and 1650.0 g vinyl acetate was used in the second monomer solution.

EXAMPLE 5

No Carboxyl Monomer

The procedure of Example 2 was followed, with the following differences. The stabilizing system consisted of 1187 g water, 54.1 g Airvol 203, and 38.7 g of Igepal. The delay feed of vinyl acetate was 1503.4 g.

EXAMPLES 6 and 7

No Chain Transfer Agent and Amount of Initiator was Reduced

The procedure of Example 2 was followed with the following exceptions:

Example 6: Initiator was reduced from 40 to 24.5 g of ammonium persulfate and from 17 to 13.6 g of sodium bicarbonate in 370 g of water, pressure was 1050 psi (71 atm), and no n-dodecyl mercaptan was added.

Example 7: Initiator was reduced to 12.6 g of ammonium persulfate and 7.0 g sodium bicarbonate in 400 g of water, pressure was 1150 psi (78 atm), and no n-dodecyl mercaptan was added.

The reactants of Examples 1–7 are summarized in Table 1.

TABLE 1

| Ex. | Initial Feed, g (% of total VAc + AA) VAc | Pressure psi Ethylene | Initiator g APS (% of VAc + AA) | NaHCO₃ | Second Feed g VAc | AA | Chain Transfer Agent, g (% VAc + AA) n-dodecyl mercaptan |
|---|---|---|---|---|---|---|---|
| 1  | 75 (5.5)   | 1000 | 40 (2.9)   | 17  | 1225.2 | 57   | 9.5 (0.6) |
| 1A | 2400 (5.1) | 900  | 700 (1.5)  | 466 | 43,100 | 1825 | 302 (0.6) |
| 1B | 3850 (8.4) | 900  | 500 (1.1)  | 320 | 39,900 | 1820 | 290 (0.6) |
| 2  | 75 (5.5)   | 1000 | 40 (2.9)   | 17  | 1225.2 | 57   | 3.8 (0.3) |
| 3  | 75 (4.5)   | 700  | 40 (2.9)   | 17  | 1525.1 | 57   | 3.8 (0.2) |
| 4  | 75 (4.2)   | 550  | 40 (2.4)   | 17  | 1650.0 | 57   | 3.8 (0.2) |
| 5  | 75 (4.8)   | 1000 | 40 (2.2)   | 17  | 1503.4 | 0    | 3.8 (0.2) |
| 6  | 75 (5.5)   | 1050 | 24.5 (1.8) | 13.6| 1225.2 | 57   | 0 |
| 7  | 75 (5.5)   | 1150 | 12.6 (0.9) | 7.0 | 1225.2 | 57   | 0 |

VAc: vinyl acetate
APS: ammonium persulfate
NaHCO₃: sodium bicarbonate
AA: acrylic acid

COMPARATIVE EXAMPLES 8–12

Commercial VAE Adhesives

For comparison purposes, known vinyl acetate-ethylene adhesives were given the same tests as samples from Examples 1–7. Airflex® 400, Airflex® 401, Airflex® 426, Airflex® 465, and Airflex® 7200 emulsion copolymers were used in each of the comparative examples. Airflex 400 (A-400) is a VAE copolymer latex having a Tg of 0° C., Airflex 401 (A-401) is a VAE latex having a Tg of −15.0° C., Airflex 426 (A-426) is a carboxyl functionalized VAE latex having a Tg of 0° C., Airflex 465 (A-465) is a high solids VAE latex having a Tg of −5° C., and Airflex 7200 Dev (A-7200) is a high solids VAE latex having a Tg of 0° C. All are available from Air Products and Chemicals, Inc.

The emulsion polymers of Examples 8–12 were prepared using typical emulsion polymerization techniques in which the monomers are added in batch to the reactor at the beginning of the process, the level of initiator is 0.01 to 1%, preferably 0.01 to 0.5%, based on the weight of vinyl acetate, and a chain transfer agent is not used.

The physical properties of the latexes of Examples 1 through 12 are shown in Table 2.

TABLE 2

| Ex. | Polymer | Approx Wt % | Mn | Mw | Tg °C. | % THF Insolubles | % Non-Volatiles | Viscosity* cps |
|---|---|---|---|---|---|---|---|---|
| 1  | VA/E/AA      | 62/35/3 | 10,100 | 82,000  | −25 | 40 | 58.7 | 3370 |
| 1A | VA/E/AA      | 65/32/3 | 10,000 | 113,000 | −18 |    |      | 2960 |
| 1B | VA/E/AA      | 67/30/3 | 4,950  | 145,000 | −15 |    |      | 2580 |
| 2  | VA/E/AA      | 62/35/3 | 9,100  | 89,000  | −24 | 34 | 57.4 | 3010 |
| 3  | VA/E/AA      | 70/27/3 | 9,700  | 86,000  | −14 | 40 | 59.8 | 8790 |
| 4  | VA/E/AA      | 76/21/3 | 9,900  | 113,000 | −2  | 37 | 56.1 | 4500 |
| 5  | VA/E         | 65/32/3 | 9,300  | 87,000  | −22 | 48 | 56.7 | 260  |
| 6  | VA/E/AA      | 65/32/3 |        |         | −21 |    |      | 874  |
| 7  | VA/E/AA      |         |        |         | −20 |    |      | 372  |
| 8  | A-400 VA/E   | ~80/20  | 60,000 | 300,000 | 0   |    |      | 1800–2700 |
| 9  | A-401 VA/E   | ~70/30  | 40,000 | 200,000 | −15 |    |      | 1300–2200 |
| 10 | A-426 VA/E/AA|         | 20,000 | 250,000 | 0   |    |      | 1000–1800 |
| 11 | A-465 VA/E   | ~78/22  |        |         | −5  |    |      | 800–1300  |
| 12 | A-7200 VA/E  | ~80/20  | 20,000 | 600,000 | 0   |    |      | 1500–3000 |

VA/E/AA: Vinyl Acetate/Ethylene/Acrylic Acid
*Brookfield RVF viscometer, #4 spindle, 20 rpm, 25° C.

Peel strength was measured for Examples 1–12 and tensile dynamic mechanical properties were measured for Examples 1A, 1B, and 4–12.

Dynamic mechanical testing of the polymer samples was accomplished using the following procedure. ASTM-D-4065-94 and ASTM-D-5026-94 were used as guidelines for this procedure. Each polymer emulsion was cast as a film and allowed to dry a minimum of several days at ambient conditions. The dry film thickness was typically in the range of 1 to 1.5 mm. The specimens used for testing were die cut from the film and were about 6.3 mm wide and 30 mm long. The specimens were tested on a Rheometrics Solid Analyzer (RSA II), from Rheometric Scientific, Inc., to obtain the tensile dynamic mechanical properties. Data were obtained every 6° C. over a −100 to 200° C. range using a fiber/film fixture and a deformation frequency of 6.28 rad/sec. To help ensure linear viscoelastic conditions, the applied strains were typically 0.05% in the glassy region and up to 1% in the rubbery region. A soak time of one minute was used at each temperature to ensure isothermal conditions. For each temperature, the RSA II calculated the tensile storage modulus (E'), tensile loss modulus (E"), and tangent delta (tan d) based on the width, thickness and length of the sample.

The following method was used to determine peel strength of the adhesives. In this standard test, cloth instead of paper is laminated to PET and MPET because paper can break down or tear before the peel strength of the adhesive is reached:

Cotton poplin cloth (mercerized, style 407) and the polymeric substrate were conditioned in a controlled environment room (23±1.0° C. and 50±2.0% relative humidity), at least 24 hours prior to use. An 8-inch by 8-inch square of polymeric substrate was then cut into 1-inch strips in the machine direction, using a precision die 1% cutter. A 6-inch wide swatch of cotton cloth was then cut from the roll in a cross-machine direction. One strip of the control substrate was coated in the controlled-environment room. Two polymeric strips were placed, test side up, on a piece of paper on a hard, smooth surface. The paper and the polymeric strip were secured at the top with a 3-inch binding clip and a wire-wound applicator was centered at the top of the strip. Using a tongue blade, a small amount of adhesive was applied to the polymeric strip just below a No. 40 wire-wound applicator. The applicator was drawn down without using pressure, the cotton cloth was immediately placed on top of the coated strip, and a 7-lb roller was passed over it once. The paper was removed and the cloth cut in half, with approximately equal distance between the two polymeric strips and at least ½-inch of cloth on each side of the strips. The lamination was placed in the controlled-environment room for at least 16 hours prior to testing. To test, the lamination was placed in an Instron Tester with the cloth strip in the top jaw and the polymeric strip in the bottom jaw. The Instron was set on a 10-lb. scale, with the crosshead speed at 2 inches per minute and the chart speed at 1 inch per minute. The strips were T-peeled at a 180° angle and the reading in pounds/linear inch (pli) recorded. The average peel strength was calculated by computing an average reading pounds/linear inch for all of the strips tested.

The following procedure was used to determine creep resistance of the adhesives by subjecting cloth laminations to an elevated temperature under a static load:

Masking tape was used to secure the top and bottom of the 9-inch side of 11 inch by 9-inch section of cotton poplin to a hard, flat, smooth surface. A No.10 wire-wound applicator was centered at the top of the shorter side of cloth and a line of emulsion was applied within 1 inch of the cloth's side edges, just below the wire-wound applicator. The applicator was drawn down and the timer started. After 60 seconds, a No.40 wire-wound applicator was placed at the top, emulsion was applied, and the applicator drawn down. The tape was removed from the bottom edge. After 120 seconds, the laminated cloth was folded in half, aligning the top and bottom edges. One pass was made with a 7-lb roller from top to bottom on one half and then the other. The lamination was allowed to air dry overnight. After drying, the laminations were cut into six 1-inch-wide strips parallel to the short side and 4 strips selected from each lamination. The laminated edges were pulled approximately 1 inch apart and the intact bond line was marked. The free edge of the strip was folded inward and clamped with a 1-inch binding clip. The strips were suspended from the ceiling of an oven set at 170° F. and a 500 g weight was placed on the free clip. At the start of the test, the oven was checked frequently for rapid separation of the lamination. The strips were removed from the oven before the weight touched the oven floor and the time of removal was recorded. When the strips were removed from the oven, the intact bond line was marked and the remainder of the lamination separated. The distance between the first and the second bond lines was measured. The creep resistance was calculated by dividing the distance of the bond lines (in millimeters) by the time (in minutes) for each sample in the oven and averaging the results of the strips tested.

Data on tensile storage modulus, peel strength, and creep resistance are presented in Table 3.

TABLE 3

| Ex | Polymer Approx. Wt % VA/E/AA | Tg ° C. | Viscosity cps | Tensile Storage Modulus* (6.28 rad/sec) dynes/cm$^2$ × 10$^6$ | | | Peel (PET) pli | Peel (MPET) pli | Creep (mm/min) |
|---|---|---|---|---|---|---|---|---|---|
| | | | | 23° C. | 45° C. | 70° C. | | | |
| 1 | VA/E/AA 62/35/3 | −24 | 3010 | — | — | — | 1.22 | 1.16 | 31.9 |
| 1A | VA/E/AA 65/32/3 | −18 | 2960 | 5.5 | 0.59 | 0.12 | 1.42 | 1.04 | 46.8 |
| 1B | VA/E/AA 67/30/3 | −15 | 2580 | 9.1 | 1.7 | 0.29 | 1.44 | 0.90 | 30.0 |
| 2 | VA/E/AA 62/35/3 | −25 | 3370 | — | — | — | 1.10 | 1.14 | 28.6 |
| 3 | VA/E/AA 60/27/3 | −14 | 8790 | — | — | — | 1.30 | 1.15 | 20.1 |
| 4 | VA/E/AA 76/21/3 | −2 | 4500 | 6.6 | 0.68 | 0.1 | 1.29 | 0.97 | 12.1 |
| 5 | VA/E 68/32 | −22 | 260 | 3.3 | 0.4 | 0.079 | 1.01 | 0.87 | — |
| 6 | VA/E/AA 65/32/3 | −21 | 874 | 6.2 | 1.6 | 0.47 | 0.86 | 0.71 | 19.1 |
| 7 | VA/E/AA | −20 | 372 | 7.7 | 2.0 | 0.60 | 0.59 | 0.51 | 11.7 |

TABLE 3-continued

| Ex | Polymer Approx. Wt % VA/E/AA | Tg °C. | Viscosity cps | Tensile Storage Modulus* (6.28 rad/sec) dynes/cm² × 10⁶ | | | Peel (PET) pli | Peel (MPET) pli | Creep (mm/min) |
|---|---|---|---|---|---|---|---|---|---|
| | | | | 23° C. | 45° C. | 70° C. | | | |
| 8 | A-400 VA/E 80/20 65/32 | 0 | 1800–2700 | 510 | 130 | 19 | 0.13 | 0.66 | 0.06 |
| 9 | A-401 VA/E 70/30 | −15 | 1300–2200 | 440 | 120 | 19 | 0.41 | 0.62 | 0.11 |
| 10 | A-426 VA/E/AA 80/20/ | 0 | 1000–1800 | 31 | 14 | 6 | 0.29 | 0.66 | 0.07 |
| 11 | A-465 VA/E 78/22 | −5 | 800–1300 | 32 | 13 | 4.8 | 0.43 | 0.48 | — |
| 12 | A-7200 VA/E ~80/20 | 0 | 1500–3000 | 27 | 11 | 4.6 | 0.31 | 0.54 | 0.10 |

*Cast film of emulsion polymer.
VA/E - Vinyl acetate-ethylene polymer emulsion.
VA/E/AA - Vinyl acetate-ethylene-acrylic acid polymer emulsion.

A graphical representation of the tensile storage modulus, as measured for Examples 1A and 1B and 4–12, is shown in FIG. 1. FIG. 2 presents a magnification of the area representing the tensile storage modulus of the polymers of this invention. The solid lines encompass the possible tensile storage modulus, at a frequency of 6.28 rad/sec, and the broken lines encompass the preferred tensile storage modulus, at temperatures between 23° C. and 70° C., of a cast film of an aqueous VAE emulsion polymer of this invention.

In order to meet requirements of adhesion to difficult to adhere surfaces, an adhesive with a peel strength of at least about 0.5 pli is acceptable and peel of at least about 0.9 pli is preferred. The data in Table 3 show that, when applied to an untreated hard to adhere surface, such as PET or MPET, VAE emulsion polymer adhesives of Examples 1–6 had significantly improved peel strength compared to known commercial VAE emulsion polymer adhesives (Comparative Examples 8–12.) The adhesives of Examples 1–7 had a peel strength of at least about 0.5 p:=on PET and MPET, the adhesives of Examples 1–6 had a peel strength of at least about 0.9 on PET, and the adhesives of Examples 1–5 had a peel strength of at least 0.9 on PET and MPET. In contrast, the commercial VAE adhesives of Comparative Examples 8–12 had a peel strength that did not exceed 0.43 on PET and did not exceed 0.66 on MPET. The tensile storage modulus of Examples 1–7 were at least about 1 order of magnitude less than the tensile storage modulus of the known VAE adhesives of Comparative Examples 8–12.

These data show that production of aqueous emulsion VAE polymers with similar ratios of vinyl acetate to ethylene, similar glass transition temperatures, and similar viscosities, leads to entirely different polymers as shown by the tensile storage modulus, peel strength, and creep resistance. Without intending to be bound by theory, it is believed that the differences in methods of preparation of the VAE adhesives of Examples 1–7, compared to the commercial VAE adhesives of Comparative Examples 8–12, result in different aqueous VAE emulsion polymers having tensile storage moduli that are considerably lower than the VAE adhesives of Comparative Examples 8–12. The preparative method described in this application leads to a VAE emulsion polymer with considerably improved peel strength compared to known VAE emulsion polymers. The distinctive features of the preparative method for aqueous VAE emulsion polymers of this invention are: addition of no more than about 15% vinyl acetate at the beginning of the polymerization and delay addition of the remainder of the vinyl acetate during polymerization, use of at least 0.5 wt % initiator, based on total monomers, and addition of a chain transfer agent. In contrast, typical VAE emulsion polymerization methods add all monomers, in batch, at the beginning of the polymerization, preferably use no more than about 0.5 wt % initiator, and do not add chain transfer agent.

The VAE adhesives of Examples 1–4 contained about 3% acrylic acid and showed the most significant improvement in peel strength (at least 0.9 pli on PET and MPET), when compared to the commercial VAE adhesives of Comparative Examples 8–12 (no more than 0.4 pli on PET and no more than 0.66 pli on MPET); especially compared to the adhesive of Comparative Example 10 (0.29 pli on PET and 0.66 pli on MPET) in which the polymer contains carboxyl functionality in the form of acrylic acid. In addition, Examples 1A, 1B and 4 showed significant differences in tensile storage modulus (5.5 to 9.1×10⁶ dynes/cm² at 23° C. and 0.1 to 0.29×10⁶ dynes/cm² at 70° C.), compared to Comparative Examples 8–12 (27 to 510×10⁶ dynes/cm² at 23° C. and 4.6 to 19×10⁶ dynes/cm² at 70° C.).

A reduction of the chain transfer agent from 9.5 g to 3.8 g (Example 2 compared to Example 1), and maintaining the level of initiator at 2.9 wt %, did not have a significant effect on peel strength. Peel remained about 1 pli on PET and MPET.

The tensile storage modulus of Example 1A and 1B (scale-ups of Example 1) was similar to the tensile storage modulus of Example 4, even though 0.6 wt % of chain transfer agent was used in Examples 1A and 1B, compared to 0.2 wt % in Example 4. The initiator level was 2.4 wt % in Example 4, compared to 1.5 and 1.1 wt % in Examples 1A and 1B, respectively.

Examples 3 and 4 showed that reducing pressure to 700 psig (Example 3) or 550 psig (Example 4) and increasing the vinyl acetate concentration in the second delay-feed, during emulsion polymerization, did not significantly affect peel strength (It remained above 1 pli on PET and MPET.) In addition, the tensile storage modulus of Example 4 was 6.6×10⁶ dynes/cm² at 23° C., and 0.1×10⁶ dynes/cm² at 70° C.

The VAE polymer of Example 5 did not contain carboxyl functionality, but the peel strength is maintained at about 1 pli for PET and 0.9 pli for MPET. Example 5 and Comparative Example 9 have similar Tg values; however, the tensile storage modulus at 23° C. and 70° C. is at least two orders of magnitude lower for Example 5 compared to the corresponding values for Comparative Example 9. In addition, the peel strength of Example 5 is much higher than Comparative Example 9 (0.41 pli on PET and 0.62 pli on MPET).

The adhesive of Comparative Example 10 contains carboxyl functionality; however, the peel is significantly lower (0.29 on PET and 0.66 on MPET) than the peel shown with Example 1–4 (at least 0.9 pli on PET and MPET) which contain 3% acrylic acid. The peel strength of Comparative Example 10 is similar to other commercial VAE adhesives that contain no carboxyl groups (comparative Examples 8–9 and 11–12.) In addition, the tensile storage modulus at 23° C. and 70° C. of Comparative Example 10 is 31×10⁶ dynes/cm² and 6×10⁶ dynes/cm², respectively, compared to the corresponding tensile storage moduli of Example 4 (6.6×10⁶ and 0.1×10⁶, respectively). The tensile storage modulus is considerably different, even though glass transition temperatures are similar. The Tg for Comparative Example 10 is 0 and the Tg for Example 4 is −5.

Example 6 showed the effects of reducing the amount of initiator to 1.8% of the total monomers, instead of 2.2%, or more, in Examples 1–5, and not adding a chain transfer agent. The peel strength of the adhesive of Example 6 (0.86 pli on PET and 0.71 pli on MPET) was less than the peel strength of Examples 1–5, but was better than the peel strength of the adhesives of Comparative Examples 8–12 (0.13 to 0.43 on PET and 0.48 to 0.66 on MPET). The tensile storage modulus for Example 6 was 6.2×10⁶ dynes/cm² at 23° C., and 0.47 dynes/cm² at 70° C., compared to 27 to 510×10⁶ dynes/cm² at 23° C., and 4.6 to 19 dynes/cm² at 70° C. for Comparative Examples 8–12.

Example 7 showed the effects of reducing the amount of initiator to 0.9% of the total monomers and not adding chain transfer agent. The peel strength (0.59 on PET and 0.51 on MPET) was not as good as in Examples 1–6; however, it was within the acceptable range for difficult to bond surfaces and the tensile storage modulus was 7.7×10⁶ dynes/cm² at 23° C. and 0.60×10⁶ dynes/cm² at 70° C.

The data of Examples 6 and 7 showed that, in the absence of a chain transfer agent, reducing the initiator below about 2 wt % affects the peel strength, especially when the initiator was reduced below about 1 wt %.

These data indicate that Tg, viscosity, or the presence of carboxyl groups, in aqueous emulsion polymers, are not, by themselves, accurate predictors of adhesive properties, even though they are known to be important properties in evaluating adhesives for difficult to bond surfaces. However, tensile storage modulus provided an excellent predictor of adhesive properties, such as peel strength.

The VAE emulsion polymers of this invention exhibit unexpected excellent peel strength compared to known VAE emulsion polymers. This property makes them particularly useful in specific adhesive applications, such as, cartons, flexible food packaging, film laminating, carton forming and sealing, plastic bottle labeling, carton windows, and collating.

We claim:

1. In an aqueous emulsion polymer adhesive comprising a vinyl acetate/ethylene copolymer, the improvement in said aqueous emulsion polymer adhesive for effecting enhanced bonding to hard to adhere to surfaces which comprises:
    said aqueous emulsion polymer adhesive is stabilized with a stabilizing system comprising polyvinyl alcohol;
    said copolymer comprises 55–80 wt % vinyl acetate, 15–45 wt % ethylene, and 0–30 wt % of one or more additional ethylenically unsaturated copolymerizable monomers, based on the total weight of monomers polymerized to form said copolymer; and,
    a cast film of the aqueous emulsion polymer adhesive has a tensile storage modulus, which when measured at a test frequency of 6.28 rad/sec and plotted as tensile storage modulus verses temperature, defines a curve which has a segment that passes from beginning to end through a region encompassed by data points: 1×10⁵ and 2×10⁷ dynes/cm² at 23° C., and 1×10³ and 2×10⁶ dynes/cm² at 70° C.

2. The adhesive of claim 1 wherein the aqueous emulsion polymeric adhesive is prepared by emulsion polymerization in the presence of a stabilizing system comprising 0.5–5 wt % polyvinyl alcohol and 1–4 wt % surfactant, based on the weight of vinyl acetate monomer.

3. The adhesive of claim 2 wherein the polymer adhesive has one or more additional polymerized units of an ethylenically unsaturated copolymerizable monomer polymerized therein.

4. The adhesive of claim 3 wherein the polymer adhesive includes polymerized units of a carboxyl-containing compound.

5. The adhesive of claim 3 wherein the polymer adhesive includes polymerized units of an ester of acrylic or methacrylic acid and a $C_1$–$C_{18}$ alkanol.

6. The adhesive of claim 5 wherein the ester of acrylic or methacrylic acid and a $C_1$–$C_{18}$, alkanol is the methanol, ethanol, butanol, or 2-ethylhexanol ester of acrylic or methacrylic acid.

7. The adhesive of claim 4 wherein the polyvinyl alcohol has a degree of polymerization ranging from 100 to 1500 and is 85–90 mole % hydrolyzed.

8. The adhesive of claim 7 wherein the polymer adhesive is formed from a monomer system comprised of from 60–75 wt % vinyl acetate, 20–40 wt % ethylene, and 1–5 wt % carboxylic acid.

9. The adhesive of claim 1 wherein the cast film of the polymer has a tensile storage modulus within an area encompassed by data points: 1×10⁶ and 1.5×10⁷ dynes/cm²at 23° C., and 3×10⁴ and 9×10⁵ dynes/cm² at 70° C.

10. The adhesive of claim 9 wherein the polymer adhesive includes polymerized units of a carboxyl-containing compound.

11. The adhesive of claim 10 wherein the polymer adhesive includes polymerized units of an ester of acrylic or methacrylic acid and a $C_1$–$C_{18}$ alkanol.

12. The adhesive of claim 11 wherein the ester of acrylic or methacrylic acid and a $C_1$–$C_{18}$ alkanol is the methanol, ethanol, butanol, and 2-ethylhexanol ester of acrylic or methacrylic acid.

13. The adhesive of claim 10 wherein the polyvinyl alcohol has a degree of polymerization ranging from 100 to 1500 and is 85–90 mole % hydrolyzed and the surfactant is an alkylphenoxy-poly(ethyleneoxy)ethanol having alkyl groups containing from about 7–18 carbon atoms, and having from about 4 to 100 ethyleneoxy units.

14. The adhesive of claim 13 wherein the polymer adhesive is comprised of polymerized units of vinyl acetate, ethylene and carboxylic acid, said vinyl acetate present in a proportion of from 60–75 wt %, said ethylene is present in a proportion of 20–40 wt % and said carboxylic acid is present in a proportion of from 1–5 wt %.

15. The adhesive of claim 13 wherein the polyvinyl alcohol has a degree of polymerization ranging from 200 to 1000 and is 87–89 mole % hydrolyzed and the polyalkoxylated compound is nonylphenolethoxylate.

16. The adhesive of claim 14 wherein the carboxylic acid functionality is provided by acrylic or methacrylic acid.

17. The adhesive of claim 16 wherein the polymer adhesive includes polymerized units of an ester of acrylic or methacrylic acid and a $C_1$–$C_{18}$ alkanol and the ester of acrylic or methacrylic acid the ester is the butanol, and 2-ethylhexanol ester of acrylic or methacrylic acid.

18. The adhesive of claim 4 wherein the polymer adhesive includes polymerized units of a diester of maleic acid and a $C_1$–$C_{18}$ alkanol.

19. The adhesive of claim 10 wherein the polymer adhesive includes polymerized units of a diesters of maleic acid and a $C_1$–$C_{18}$ alkanol.

20. In a method for bonding a low surface energy film to another film substrate with an aqueous emulsion polymer adhesive for use as a multi-layer packaging material, said low surface energy film selected from the group consisting of polyethylene, polypropylene and polyethylene terephthalate, the improvement for effecting enhanced bonding of said low surface energy film to said another film substrate which comprises:

utilizing as said adhesive an aqueous emulsion polymer adhesive comprising a vinyl acetate/ethylene copolymer stabilized with a stabilizing system comprising polyvinyl alcohol; said copolymer comprises 60–75 wt % vinyl acetate, 20–40 wt % ethylene, and 0–30 wt % of one or more additional ethylenically unsaturated copolymerizable monomers, based on the total weight of monomers polymerized to form said copolymer; and, further a cast film of the aqueous emulsion polymer adhesive has a tensile storage modulus, which when measured at a test frequency of 6.28 rad/sec and plotted as tensile storage modulus verses temperature, defines a curve which has a segment that passes from beginning to end through a region encompassed by data points: $1\times10^5$ and $2\times10^7$ dynes/cm$^2$ at 23° C., and $1\times10^3$ and $2\times10^6$ dynes/cm$^2$ at 70° C.

21. The method of claim 20 wherein the aqueous emulsion polymeric adhesive is prepared by emulsion polymerization in the presence of a stabilizing system comprising 0.5–5 wt % polyvinyl alcohol and 1–4 wt % surfactant, based on the weight of vinyl acetate monomer.

22. The method of claim 21 wherein the polymer adhesive has one or more additional polymerized units of an ethylenically unsaturated copolymerizable monomer polymerized therein.

23. The method of claim 22 wherein the polymer adhesive includes polymerized units of a carboxyl-containing compound.

24. The method of claim 23 wherein the polymer adhesive includes polymerized units of an ester of acrylic or methacrylic acid and a $C_1$–$C_{18}$ alkanol or a diester of maleic acid and a $C_{1-18}$ alkanol.

25. The method of claim 24 wherein the ester of acrylic or methacrylic acid and a $C_1$–$C_{18}$ alkanol is the 2-ethylhexanol ester of acrylic or methacrylic acid.

26. The method of claim 23 wherein the polyvinyl alcohol has a degree of polymerization ranging from 100 to 1500 and is 85–90 mole % hydrolyzed.

27. The method of claim 26 wherein the polymer adhesive is formed from a monomer system comprised of from 60–75 wt % vinyl acetate, 20–40 wt % ethylene, and 1–5 wt % carboxylic acid.

28. The method of claim 21 wherein the cast film of the polymer has a tensile storage modulus within an area encompassed by data points: $1\times10^6$ and $1.5\times10^7$ dynes/cm$^2$ at 23° C., and $3\times10^4$ and $9\times10^5$ dynes/cm$^2$ at 70° C.

29. The method of claim 28 wherein the polymer adhesive includes polymerized units of a carboxyl-containing compound.

30. The method of claim 29 wherein the polymer adhesive includes polymerized units of an ester of acrylic or methacrylic acid and a $C_1$–$C_{18}$ alkanol.

31. The method of claim 30 wherein the ester of acrylic or methacrylic acid and a $C_1$–$C_{18}$ alkanol is the 2-ethylhexanol ester of acrylic or methacrylic acid.

32. The method of claim 29 wherein the polymer adhesive is comprised of polymerized units of vinyl acetate, ethylene and carboxylic acid, said vinyl acetate present in a proportion of from 60–75 wt %, said ethylene is present in a proportion of 20–40 wt % and said carboxylic containing compound is present in a proportion of from 1–5 wt %.

33. The method of claim 32 wherein the carboxylic containing compound is provided by acrylic or methacrylic acid.

34. The method of claim 33 wherein the polymer adhesive includes polymerized units of butyl acrylate or 2-ethylhexyl acrylate.

35. The method of claim 33 wherein the polymer adhesive includes polymerized units of a diester of maleic acid and a $C_1$–$C_{18}$ alkanol.

36. The method of claim 27 wherein said lower surface energy film is polyethylene.

37. The method of claim 33 wherein said lower surface energy film is polyethylene terephthalate.

38. The adhesive of claim 4 wherein the surfactant in the stabilizing system is a polyalkoxylated surfactant.

39. The method of claim 23 wherein the surfactant in the stabilizing system is a polyalkoxylated surfactant.

40. The method of claim 27 wherein the stabilizing system is comprised of from 2–5 wt. % of polyvinyl alcohol and 1.5–3% of said polyalkoxylated surfactant.

41. The method of claim 32 wherein said stabilizing system is comprised of 0.5–5% polyvinyl alcohol and 1–4 wt. % of surfactant.

42. The adhesive of claim 38 wherein the stabilizing system is comprised is from 2–5 wt. % of polyvinyl alcohol and 1.5–3% of said polyalkoxylated surfactant.

43. The method of claim 40 wherein the polymer adhesive includes polymerized units of a diester of maleic acid and a $C_1$–$C_{18}$ alkanol and the carboxylic acid employed is acrylic acid.

* * * * *

UNITED STATES PATENT AND TRADEMARK OFFICE
CERTIFICATE OF CORRECTION

PATENT NO. : 6,063,858
DATED : 16 May 2000
INVENTOR(S) : Christian L. Daniels, et al.

It is certified that error appears in the above-identified patent and that said Letters Patent is hereby corrected as shown below:

On the face of Patent 6,063,858, please correct the spelling of the inventor "Randolf J. Lorenz" to "Randolph J. Lorenz".

Signed and Sealed this

First Day of May, 2001

Attest:

NICHOLAS P. GODICI

Attesting Officer     Acting Director of the United States Patent and Trademark Office